United States Patent
Pecho et al.

(10) Patent No.: US 8,123,275 B2
(45) Date of Patent: Feb. 28, 2012

(54) CONVERTIBLE TOP FOR A CONVERTIBLE VEHICLE

(75) Inventors: Walter Pecho, Ringelai (DE); Karl-Heinz Kaiser, Schwanenkirchen (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 265 days.

(21) Appl. No.: 12/454,618

(22) Filed: May 20, 2009

(65) Prior Publication Data

US 2009/0289468 A1 Nov. 26, 2009

(30) Foreign Application Priority Data

May 22, 2008 (DE) .......... 10 2008 024 718

(51) Int. Cl.
*B60J 1/18* (2006.01)
*B60J 7/12* (2006.01)

(52) U.S. Cl. ............. 296/146.14; 296/107.07; 296/145; 160/369

(58) Field of Classification Search ............. 296/146.14, 296/107.07, 145; 160/369
See application file for complete search history.

(56) References Cited

U.S. PATENT DOCUMENTS

| | | | | |
|---|---|---|---|---|
| 5,320,400 A | * | 6/1994 | Orth et al. | 296/146.14 |
| 5,558,390 A | * | 9/1996 | Hemmis et al. | 296/146.14 |
| 5,887,936 A | * | 3/1999 | Cowsert | 296/107.07 |
| 6,464,285 B1 | * | 10/2002 | Schutt | 296/107.07 |
| 6,471,283 B2 | | 10/2002 | Windpassinger et al. | |

FOREIGN PATENT DOCUMENTS

| | | |
|---|---|---|
| DE | 295 08 427 U1 | 9/1996 |
| DE | 100 07 575 A1 | 5/2001 |
| DE | 100 56 894 A1 | 5/2002 |
| EP | 1 207 063 B1 | 1/2005 |

* cited by examiner

*Primary Examiner* — Dennis Pedder
(74) *Attorney, Agent, or Firm* — Davidson, Davidson & Kappel, LLC

(57) ABSTRACT

The invention relates to a convertible top for a convertible vehicle, comprising a convertible top material having a cut-out, a profile part, and a window element, the profile part comprising a first connecting region and a second connecting region, wherein the first connecting region is assigned to the window element and wherein the second connecting region is assigned to the convertible top material, wherein a first adhesive layer is substantially encompassed by the first connecting region and the window element, said first adhesive layer defining a first adhesive connection between the window element and the profile part. A convertible top for a convertible vehicle which has an improved connection to a window element is provided in that the profile part is connected to the second connecting region of the convertible top material using a stitched connection.

16 Claims, 3 Drawing Sheets

CONVERTIBLE TOP FOR A CONVERTIBLE VEHICLE

Priority is claimed to German Patent Application 10 2008 024 718.9-24, filed on May 22, 2008, the entire disclosure of which is incorporated by reference herein.

FIELD OF THE INVENTION

The invention relates to a convertible top for a convertible vehicle.

BACKGROUND

DE 100 07 575 A1 describes a convertible top for a convertible vehicle, comprising a convertible top material and a window element which is arranged in a cutout of the convertible top material and forms a rear window of the convertible vehicle. The window element is connected to the convertible top material by a cast resin element encircling the edge region of the window element. In a first exemplary embodiment, the cast resin element covers an edge, which faces the interior region of the convertible vehicle, of the cutout of the convertible top material, as a result of which the latter is stabilized. The window element is adhesively bonded to the edge of the convertible top material by means of an adhesive on a side of the convertible top material facing the exterior region of the convertible vehicle. In a second exemplary embodiment, the convertible top material is surrounded by the cast resin element in an edge region of the cutout both on the side facing the interior region of the convertible vehicle and on the side facing the exterior region of the convertible material. The window element is adhesively bonded by means of an adhesive to that side of the convertible top material which faces the exterior region of the convertible vehicle, and therefore that part of the cast resin element which is arranged on the outer side of the convertible top material is covered by the edge of the window element. This connection is produced by the edge region of the convertible top material in the vicinity of the cutout first of all being adhesively bonded to the edge of the window element and subsequently the convertible top material and the window element being jointly casted around with the cast resin. In a further exemplary embodiment, the window element is adhesively bonded to a metal strip provided with holes. The convertible top material is connected to the metal strip by the convertible top material and the metal strip being casted around with cast resin, with the convertible top material being connected in particular through the holes provided in the metal strip. A disadvantage of the described connection of the window element to the convertible top material is that the window element can no longer be detached from the convertible top material when it is adhesively bonded directly thereto without the convertible top material being damaged. An exchange of the window element at a later time, for example for repair purposes, is therefore not possible without renewing the convertible top material in its entirety. Therefore, simple exchange of the window element in a motor vehicle workshop is ruled out. Another disadvantage is that the connection of the window element to the convertible top material by means of the cast resin element can be produced only in a highly complicated manner. For this purpose, the convertible top material and the window element have to be inserted together into a casting mold, with it being possible in particular for the correct positioning of the convertible top material relative to the edge regions of the window element to be controlled only with difficulty. Exacting demands regarding the correct positioning of the window element relative to the surrounding convertible top material can therefore be met only with difficulty.

DE 295 08 427 U1 describes a connection of a window element to the convertible top material of a convertible top of a convertible vehicle in a cutout of the convertible top material. For this purpose, an edge region of the window element is encapsulated with a cast resin element having an undercut. An edge region of the cutout of the convertible top material is connected to a profile part which likewise has an undercut. The window element can be connected to the convertible top material by a form-fitting connection of the cast resin element to the profile part. In order to secure the form-fitting connection between the cast resin element and profile part, clips which engage round the cast resin element and the profile part are placed on the side facing the interior region of the convertible vehicle. The window element can be released at a later time from the convertible top material by releasing the clips and undoing the form-fitting connection between the cast resin element and the profile part. A disadvantage of the described arrangement is that the connection between the window element and convertible top material can be produced only in a highly complicated manner. In particular, the window element and the convertible top material first of all have to be connected separately from each other to the cast resin element and the profile part, as a result of which, when the window element is inserted into the cutout, the positioning of the window element relative to the convertible top material can no longer be changed. In addition, the securing of the connection between the window element and convertible top material by means of clips can be produced only in a complicated manner and is time-consuming.

DE 100 56 894 A1 describes a convertible top of a convertible vehicle comprising a convertible top fabric and a rear window. The rear window is disposed in a cutout of the convertible top fabric and is adhesively bonded to the convertible top fabric in such a way that an inner edge portion of the top fabric is adhered to a corresponding outer edge portion of the rear window, said inner edge portion of the top fabric pointing towards an interior region of the vehicle and said outer edge portion of the rear window pointing towards an exterior region of the vehicle. A top fabric ribbon is fixedly connected to an inner surface of the top fabric pointing towards an interior region of the vehicle and is further adhered to an inner edge portion of the rear window, said inner edge portion of the rear window pointing towards an interior region of the vehicle. Accordingly, the edge of the rear window is encompassed by the convertible top fabric and the top fabric ribbon. A C-shaped profile part for receiving a piping of an inner roof lining is fixedly connected to an inner surface of the top fabric ribbon, said inner surface pointing towards an interior region of the vehicle. A disadvantage of the described connection of the rear window and the convertible top fabric is that the rear window can no longer be detached from the convertible top material without the convertible top fabric being damaged. An exchange of an broken rear window is therefore not possible without renewing the convertible top fabric in its entirety.

SUMMARY OF THE INVENTION

It is an object of the invention to provide a convertible top for a convertible vehicle, which has an improved connection to a window element.

It is an further object of the invention to provide a convertible top for a convertible vehicle having a window element which is replaceable in a simple fashion.

It is an further object of the invention to provide a convertible vehicle top material, which allows for on-spot replacement of a rear window of the convertible vehicle.

These and other objects of the invention are achieved by a convertible top for a convertible vehicle, comprising a convertible top material having a cutout, a profile part, and a window element, the profile part comprising a first connecting region and a second connecting region, wherein the first connecting region is assigned to the window element and wherein the second connecting region is assigned to the convertible top material, wherein a first adhesive layer is substantially encompassed by the first connecting region and the window element, said first adhesive layer defining a first adhesive connection between the window element and the profile part, and wherein the profile part is connected to the second connecting region of the convertible top material using a stitched connection.

These and other objects of the invention are also achieved by a convertible top for a convertible vehicle, comprising a convertible top material, a profile part, and a window element, wherein the window element is adhesively bonded to the profile part, and wherein the convertible top material is sewn to the profile part.

These and other objects of the invention are also achieved by a convertible vehicle top material comprising a top cloth, a rear window, and a rear window frame, wherein said rear window frame is sewn to the top cloth, and wherein the rear window is adhesively bonded to said rear window frame.

These and other objects of the invention are further achieved by a convertible top for a convertible vehicle, comprising a convertible top material being fixedly received between a profile part and a stiffening element, wherein said stiffening element is located on a first side of the convertible top material, said first side pointing to an interior region of the vehicle, and wherein a window element is detachably connected to a second side of said profile part, said second side pointing to an exterior region of the vehicle.

By means of the provision of a profile part with a first connecting region and a second connecting region, with a first adhesive layer being at least substantially encompassed by the first connecting region and the window element defining a first adhesive connection between the window element and the profile part, and the profile part being connected in the second connecting region to the convertible top material by means of a stitched connection, a surprisingly simple and secure connection of the window element to the convertible top material is achieved, with it advantageously being possible to release the window element from the convertible top in a simple manner at a later time by releasing the first adhesive connection between the window element and the profile part without the convertible top material being damaged. Furthermore, after the first adhesive layer is removed from the profile part and the window element, the window element can easily be connected again to the convertible top by a new first adhesive layer being applied to the first connecting region of the profile part and the window element being connected again to the first connecting region of the profile part. In particular, it is therefore advantageously made possible, in the case of a convertible vehicle with a rear window connected fixedly to the convertible top material, to provide a rear window which can be exchanged in a simple manner and without expensive special tools, in a similar manner as in the case of conventional vehicles having a fixed roof. Owing to the fact that the second connecting region of the profile part and the convertible top material are connected to each other by means of a stitched connection, a particularly secure and particularly neat and esthetically attractive connection between the convertible top material and the profile part is also achieved. It is particularly advantageous that the connection of the convertible top material to the window element permits exact positioning both of the convertible top material and of the window element relative to the profile part in a particularly simple manner, since, during a curing process of the first adhesive connection, corrections can still be undertaken and the stitched connection can easily be produced in a precise manner. The convertible top is thus produced all in all without the window element or the convertible top material being placed into a casting mold.

The first connecting region and the second connecting region are preferably spaced apart from each other by a joint region located in between. This firstly permits an esthetically particularly attractive configuration of the connection of the window element to the convertible top material. Secondly, the joint region is expediently designed for receiving a sealant. For this purpose, the profile part preferably has a depression or undercut in which a sealant, for example a sealing band, can be fixed in a clamping manner. This results in a simple manner in a secure and visually attractive sealing of the connecting region against an ingress of dirt or rainwater.

Connecting means such as a connecting portion for connecting an inside roof lining are preferably provided. In this case, the connecting means are expediently arranged on a side of the profile part facing an interior region of the vehicle. It is thereby possible in a particularly simple manner to line a surface section of the convertible top-material, which surface section faces the interior region of a convertible vehicle, with a sound-deadening and heat-insulting inside roof lining. In particular, the connecting means can be designed in this case as depressions of the profile part, in which depressions a piping element of the inside roof lining can be fixed in a clamping manner.

The stitched connection preferably comprises a stiffening element such as a receiving element. Further stiffening and stabilization of the convertible top in the vicinity of the window element is achieved by the provision of a receiving element which is preferably of dimensionally stable design. In this case, the receiving element is preferably arranged on a side of the convertible top material facing away from the profile part. In this configuration, in which the convertible top material is accommodated between the profile part and the receiving element, and in which the profile part, the convertible top material and the receiving element are preferably stitched together as a whole, the profile part can advantageously be of relatively narrow and thin design, with sufficient stiffening of the convertible top in the vicinity of the window element nevertheless being achieved by the interaction of the profile part with the receiving element. Sufficient dimensional stability of the convertible top is therefore ensured even if the adhesive connection between the profile part and window element is released and the window element is removed.

In each configuration, the first connecting region of the profile part is preferably arranged on a side of the profile part facing the exterior region of the convertible vehicle. Therefore, in an exterior view of the vehicle, the window element covers the first connecting region of the profile part, which further improves a visual design of the connecting region.

The second connecting region of the profile part is preferably also arranged on a side of the profile part facing an exterior region of the vehicle. In particular if the first connecting region is also arranged on a side facing the exterior region of the vehicle, a connection of the convertible top material to the window element can thereby be advantageously achieved, in which connection outer surfaces of the convertible top material and of the window element are arranged next to each other in a common plane.

In a further, likewise preferred configuration, the second connecting region is arranged on a side of the profile part facing away from the first connecting region. This advantageously makes it possible for the profile part to be of particularly narrow design while the secure connection of the convertible top material and of the window element is unchanged.

The profile part is preferably formed from a metal, in particular from aluminum. This results in an excellent stiffening of the convertible top in the region of the window element. It has to be understood that the profile part may also be formed, however, from any other material meeting the specific requirements, in particular from a plastic or from a glass-fiber-reinforced polyamide.

The window element is preferably formed from a glass material. However, it goes without saying that the window element can also be formed from a different material, for example a plastic. In particular, the window element can also be formed from an opaque material.

The profile part preferably completely surrounds an outer edge of the window element. As an alternative to this, however, it can also be provided that the profile part is of multi-part design comprising at least two profile members, and wherein each of the at least two profile members is arranged adjacent to a corresponding outer edge portion of a window element. In both configurations, a secure connection of the window element to the convertible top material is achieved, with a sufficient stiffening of the convertible top in the region of the window element being obtained in each case.

Further advantages and features of the invention emerge from the description below of preferred exemplary embodiments and from the dependent claims.

The invention is explained in more detail below using a preferred exemplary embodiment and with reference to the attached drawings.

DETAILED DESCRIPTION

Figure 2:
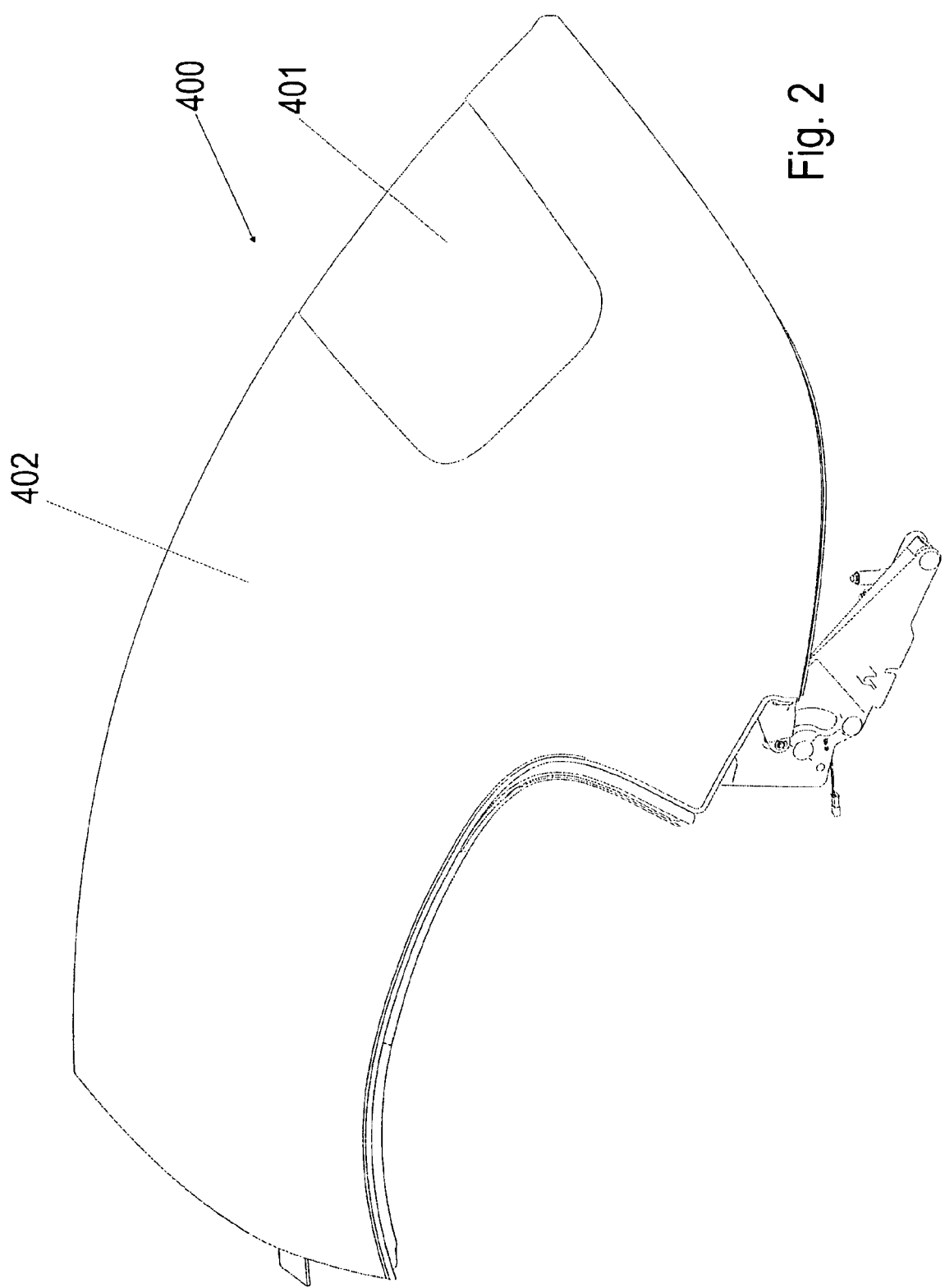
FIG. 2 shows the convertible top of the first exemplary embodiment according to FIG. 1.

FIG. 2 schematically shows a first exemplary embodiment of a convertible top 400 comprising a convertible top material 402 and a window element 401 defining a rear window of a convertible vehicle.

Figure 1:
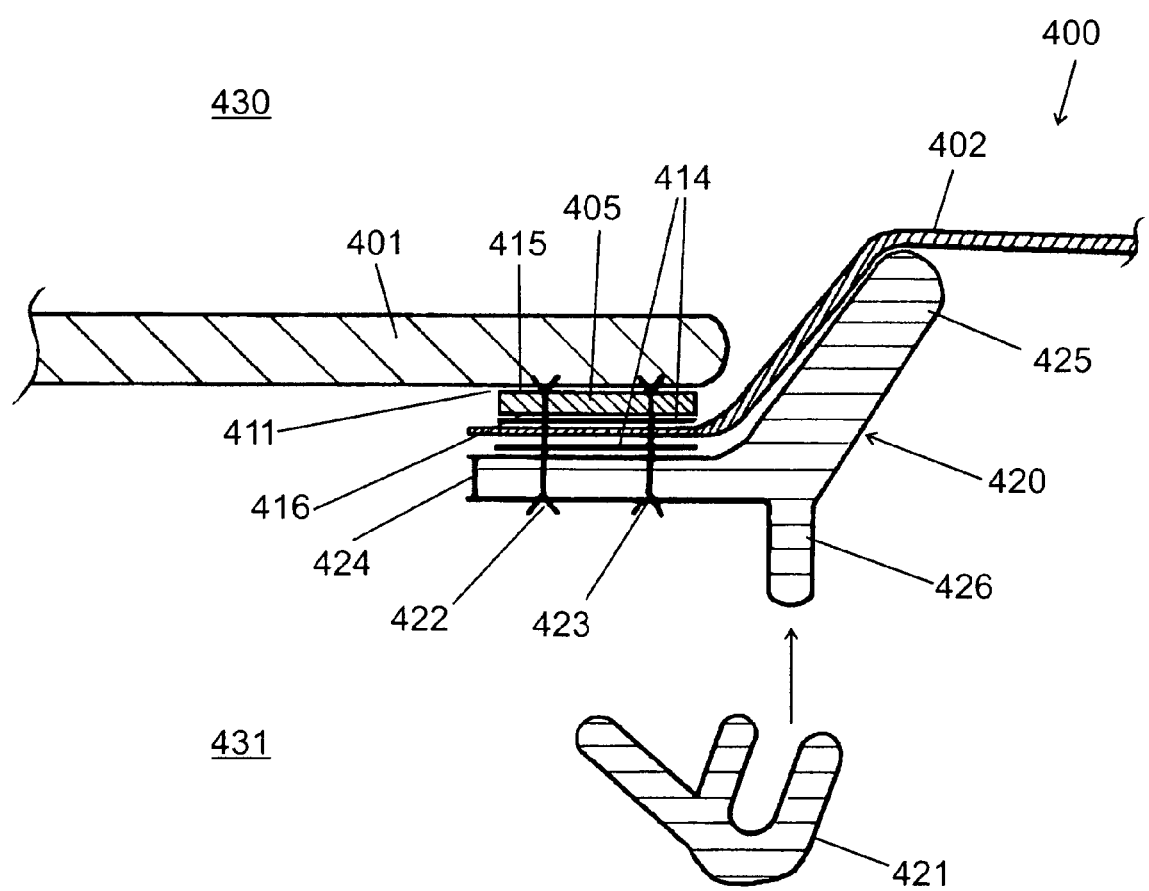
FIG. 1 shows, in a cross-sectional view, the connecting region of a window element to a convertible top material according to a first exemplary embodiment.

FIG. 1 schematically shows, in a cross-sectional view, a first exemplary embodiment of the convertible top 400, with a connection region of the window element 401 to the convertible top material 402 being illustrated. In this case, a profile part 405 forms a connecting member between the window element 401 and the convertible top material 402. The sectional plane of the cross-sectional view illustrated extends normally to the plane of extent of the convertible top material 402 and of the window element 401 and normally with respect to the longitudinal extent of the profile part 405.

The window element 401, which in the present case forms a rear window of the convertible vehicle, has an interior surface facing the interior region 431 of the convertible vehicle and an exterior surface facing the exterior region 430 of the convertible vehicle. An adhesive layer 411 of a first adhesive is applied to the interior surface of the window element 401 in the vicinity of the edge of the window element 401. The first adhesive layer 411 forms a first adhesive connection between the window element 401 and the profile part 405. Sealing bands 414 serving to seal the interior region 431 in relation to the exterior region 430 are provided on both sides of the edge region of the convertible top material. In particular, moisture is to be prevented from penetrating the region of the stitched connections 422, 423 described below. For this purpose, the sealing bands are formed from a self-sealing material, for example a very fine-pored polyurethane foam.

The profile part 405 has an approximately rectangular shape in cross section, with the profile part 405 having a longitudinal extent in a direction perpendicular to the plane of the paper in the illustration according to FIG. 1. The profile part 405 overall completely surrounds an edge region of the interior surface of the window element 401 and therefore forms a window frame of the window element 401. The rectangular cross section of the profile part 405 has a long outer side surface facing the exterior region 430 of the convertible vehicle and a long inner side surface directed toward the interior region 431 of the convertible vehicle, said side surfaces being connected to each other via an in each case short first edge surface and second edge surface. The inner side surface of the profile part 405 facing the interior region 431 of the convertible vehicle is designed as a second connecting surface 416. An edge region 402 of the convertible top material is connected fixedly to the profile part 405 by means of two stitched connections 422, 423. The two stitched connections 422, 423 are designed as seams which run parallel to each other, are spaced apart from each other and spaced apart from the edge of the window element 401. The stitched connections 422, 423 pass (at least partially) through the profile part 405, the edge region of the convertible top material 402 and the sealing bands 414. Furthermore, a receiving element 420 is connected fixedly to the convertible top material 402 and the profile part 405 via the stitched connection 422, 423 and is at least partially passed through by the stitched connections 422, 423. The receiving element 420 extends substantially parallel to the profile part 405 and has a first limb 424 facing the profile part 405, a second limb 425 arranged at an obtuse angle to the first limb 424 and a third limb 426 directed toward the interior region 431 of the convertible vehicle. The effect advantageously achieved by the receiving element 420 is a stiffening of the convertible top 400 in the region of the window element 401, with, at the same time, an overall narrow and space-saving construction of the connecting region being maintained. The third limb 426 serves here to receive a fastening element 421 of an inside roof lining (not illustrated).

A characteristic of the convertible top described is that the first adhesive layer 411 covers the stitched connections 422, 423 such that the window element 401 is also adhesively bonded onto the stitched connections 422, 423. This advantageously results in a further sealing of the interior region 431 in relation to the exterior region 430, in particular against the ingress of moisture.

A particular advantage of the above-described arrangement is that the connection between the window element 401 and the convertible top material 402 can be released at any time using simple means and without the risk of damaging the convertible top material 402, for example in order to exchange the window element 401 for repair purposes. All that is necessary for this is to sever the first adhesive connection between the window element 401 and the first connecting region 415 of the profile part 405 using a suitable tool. This can take place with the convertible top of the convertible vehicle closed, since the convertible top material 402 is stabilized by the profile part 405 even when the window element is removed. After removal of adhesive residues from the first connecting region 415 of the profile part 405 and from the edge region of the window element 401, the latter can be connected again to the profile part 405, for which purpose a new first adhesive layer 411 is applied to the first connecting region 415 or to the edge region of the window element 401. It has to be understood that the adhesive applied can be either a spreadable material or a firm material, for example a strip of adhesive or a welding strip.

Figure 3:
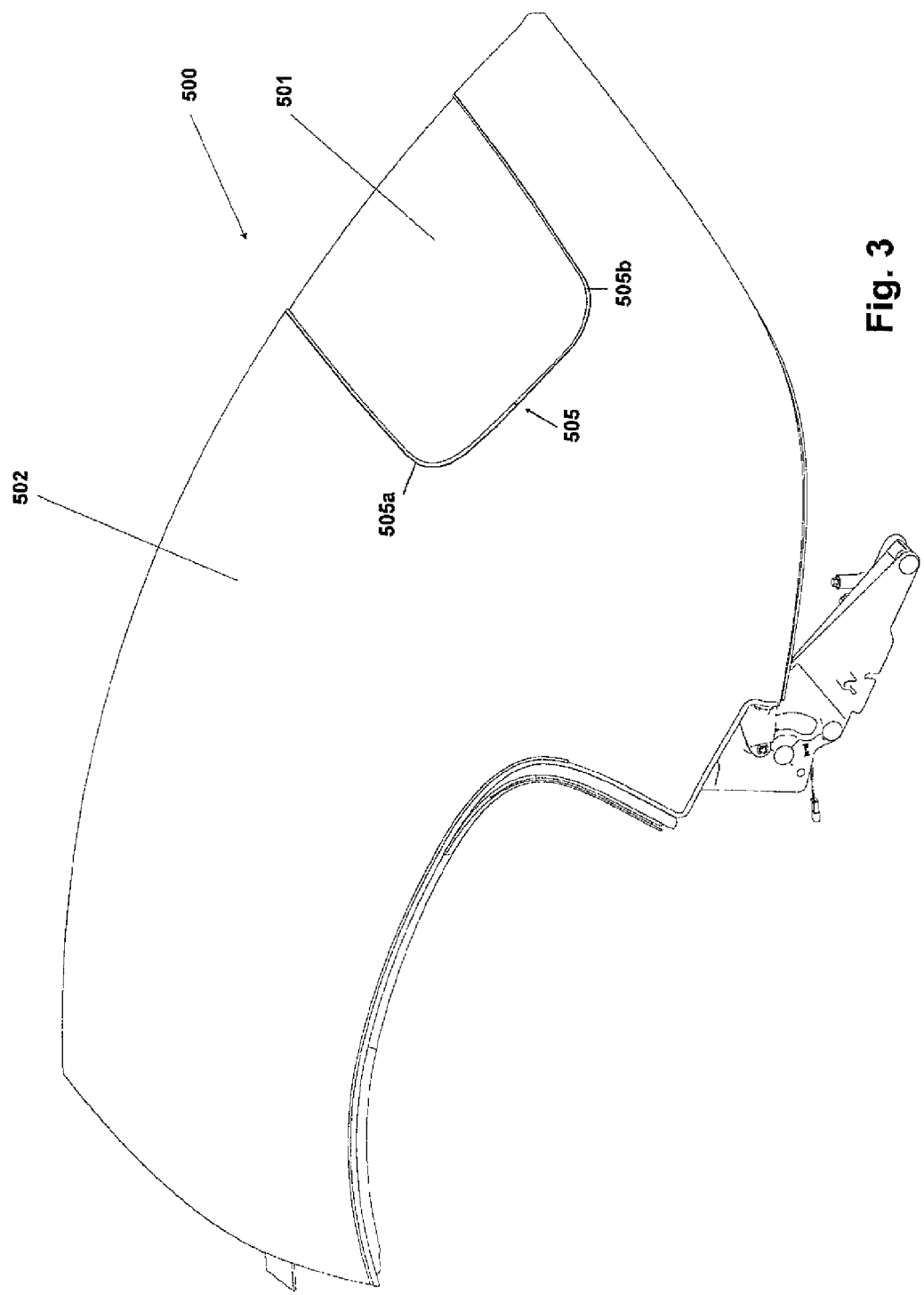
FIG. 3 shows a convertible top of a second exemplary embodiment of the present invention.

FIG. 3 schematically shows a second exemplary embodiment of a convertible top 500 comprising a convertible top material 502 and a window element 501 defining a rear window of a convertible vehicle. A profile part 505 of multi-part design comprising at least two profile members, in the form of two profile members 505a, 505b, each arranged adjacent to a corresponding outer edge portion of window element 501.

What is claimed is:

1. A convertible top for a convertible vehicle, comprising:
   a convertible top material,
   a profile part, and
   a window element,
   wherein the convertible top material is sewn to the profile part and defines a seam,
   wherein the window element is adhesively bonded to the seam and to the profile part,
   wherein the seam traverses a first limb of a stiffening element arranged on an interior surface of the convertible top material facing away the profile part, and wherein a second limb of the stiffening element protrudes in an obtuse angle from the first limb and protrudes beyond a plane spanned by an exterior face of the window element and stretching the convertible top material beyond said surface, such that the surface of the window element is recessed compared to an exterior surface of the convertible top material when seen from an exterior region.

2. The convertible top as claimed in claim 1, wherein the profile part is fully sandwiched between the window element and the convertible top material.

3. The convertible top as claimed in claim 1, further comprising a connecting portion for receiving an interior roof lining.

4. The convertible top as claimed in claim 3, wherein the connecting portion is arranged facing an interior region of the vehicle.

5. The convertible top as claimed in claim 2, wherein a first connecting region of the profile part is arranged on a side of the profile part pointing to an exterior region of the vehicle.

6. The convertible top as claimed in claim 5, wherein a second connecting region of the profile part is arranged on a side of the profile part pointing to an interior region of the vehicle.

7. The convertible top as claimed in claim 6, wherein the second connecting region is arranged on a side of the profile part facing away from the first connecting region.

8. The convertible top as claimed in claim 1, wherein the profile part is formed from a metal.

9. The convertible top as claimed in claim 8, wherein the metal is aluminum.

10. The convertible top as claimed in claim 1, wherein the window element is made of a glass material.

11. The convertible top as claimed in claim 1, wherein the window element defines a rear window of the convertible vehicle.

12. The convertible top as claimed in claim 1, wherein the profile part completely surrounds an outer edge of the window element.

13. The convertible top as claimed in claim 1, wherein the profile part is of multi-part design comprising at least two profile members, and wherein each of the at least two profile members is arranged adjacent to a corresponding outer edge portion of the window element.

14. The convertible top as claimed in claim 1,
   wherein the seam is covered by a surface of the window element located close to an edge of the rear window, and
   wherein the edge of the window element is facing towards the convertible top material.

15. The convertible vehicle top material as claimed in claim 14, wherein a broken window can be detached from the profile part by severing the adhesive bond of the window element to said profile part such that an on-spot replaceable window element option is provided.

16. The convertible top as claimed in claim 1, wherein the stiffening element comprises a connecting portion for the connection of an interior roof lining.

* * * * *